N. R. THIBERT.
MACHINE FOR FORMING WIRE.
APPLICATION FILED MAR. 23, 1921.
1,426,425.
Patented Aug. 22, 1922.
6 SHEETS—SHEET 1.
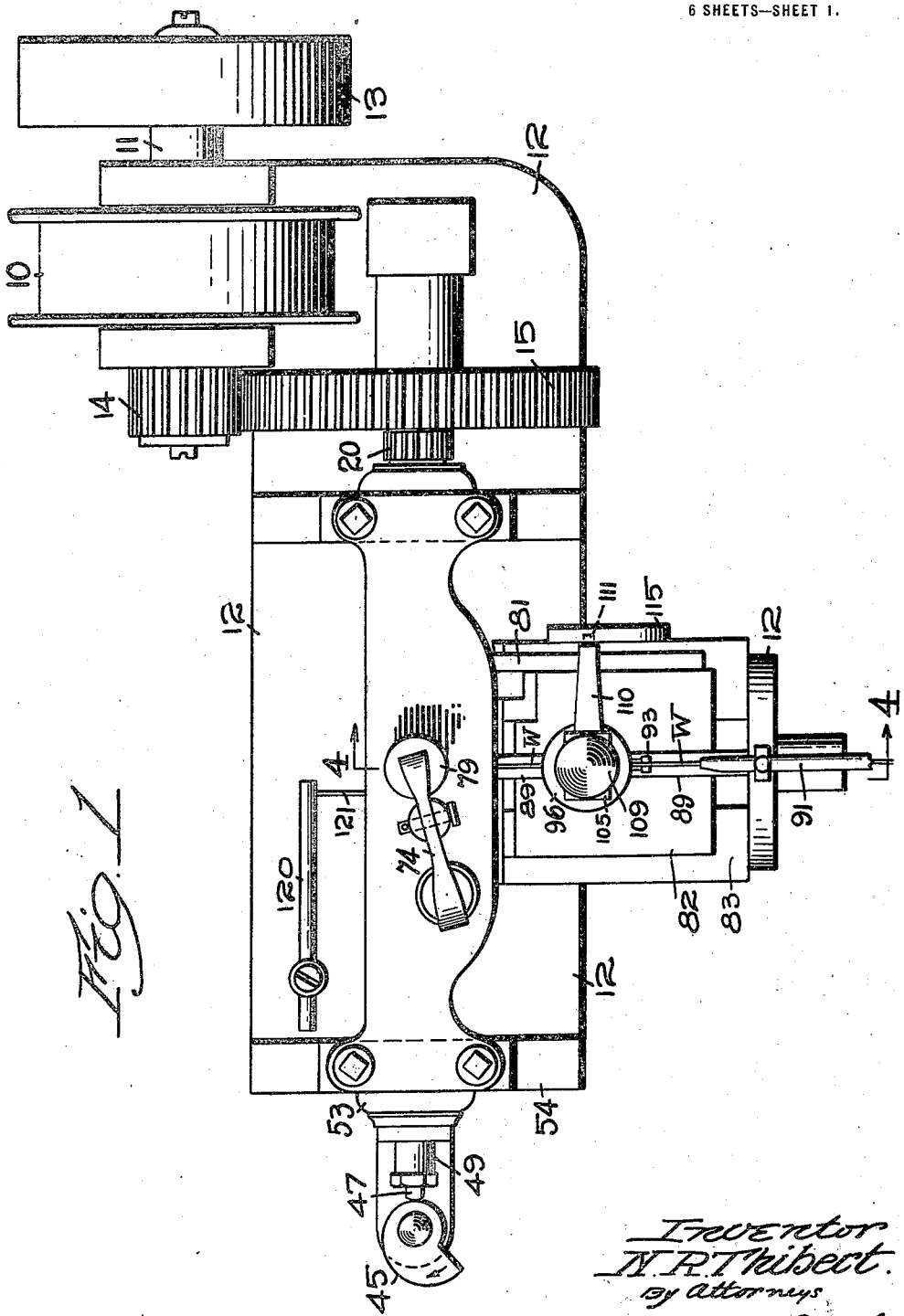

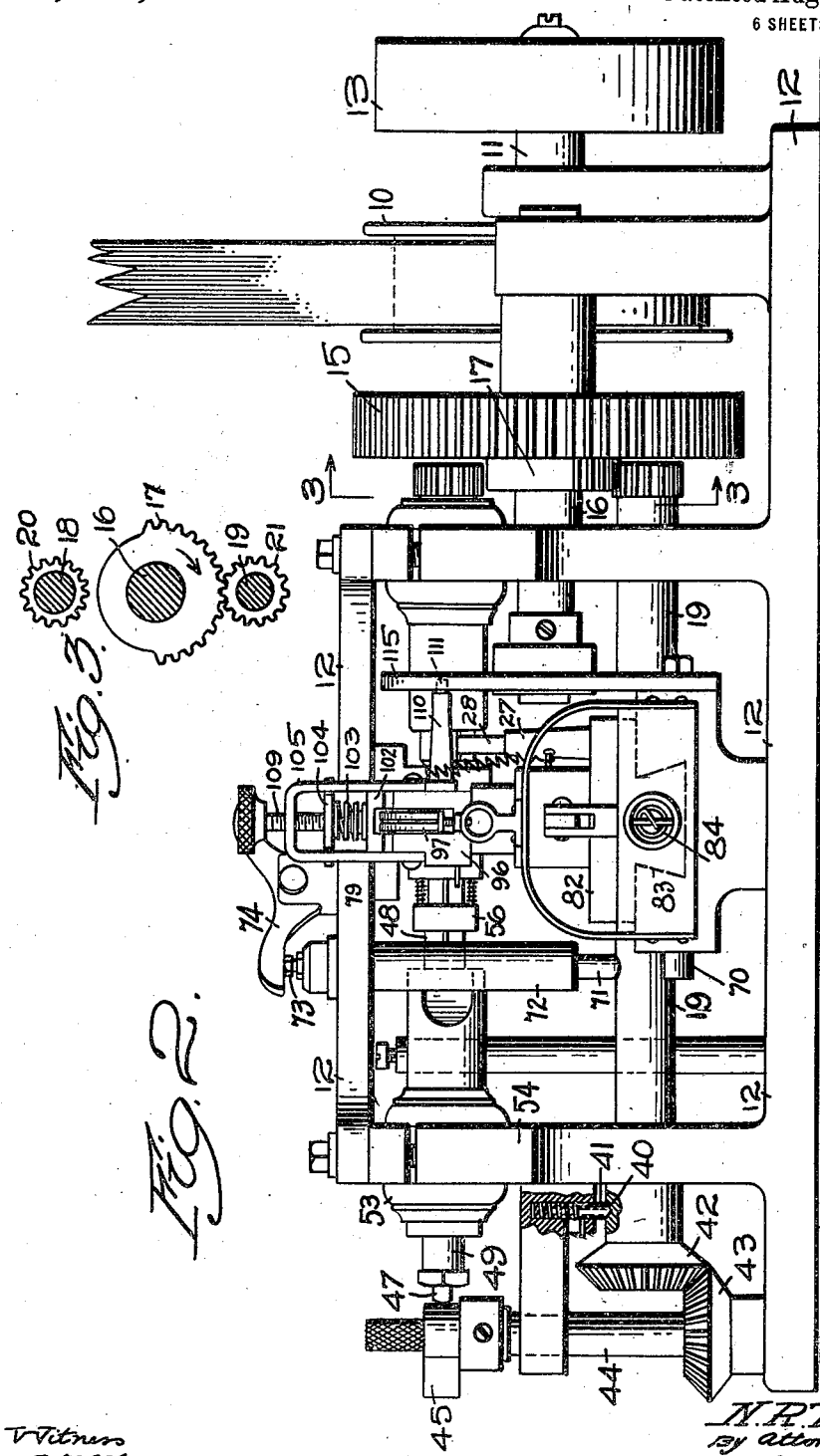

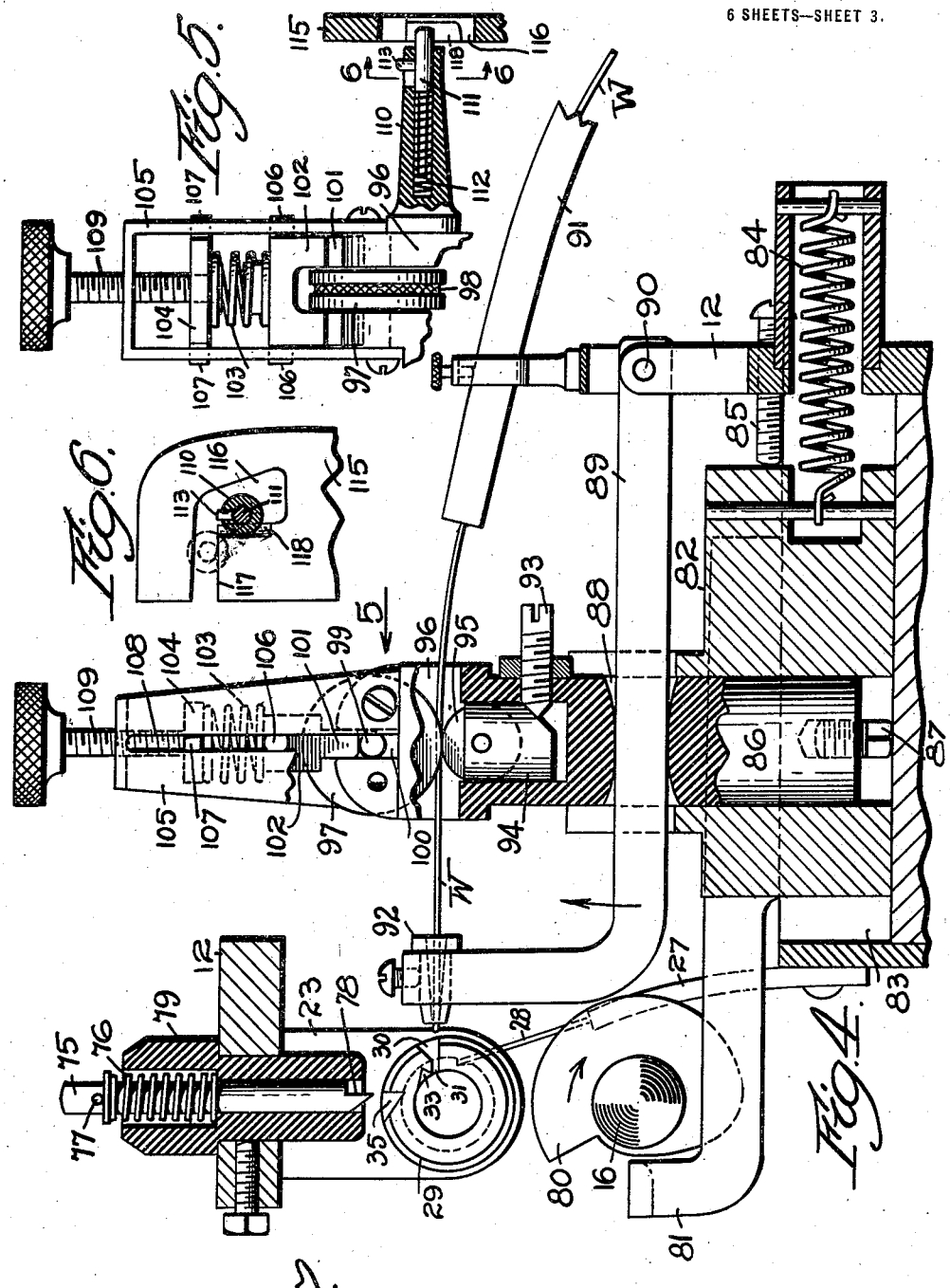

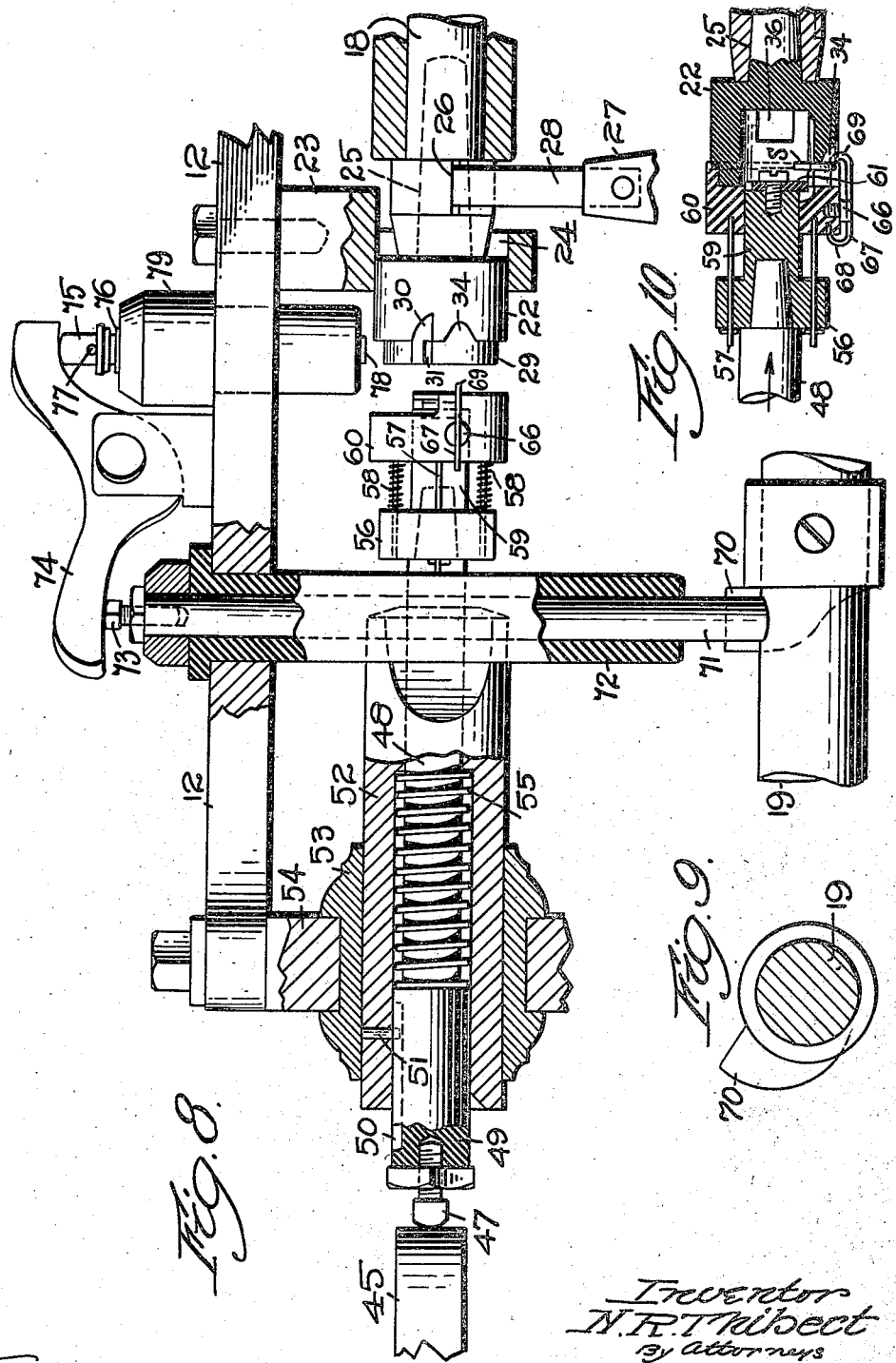

N. R. THIBERT.
MACHINE FOR FORMING WIRE.
APPLICATION FILED MAR. 23, 1921.
1,426,425.
Patented Aug. 22, 1922.
6 SHEETS—SHEET 5.
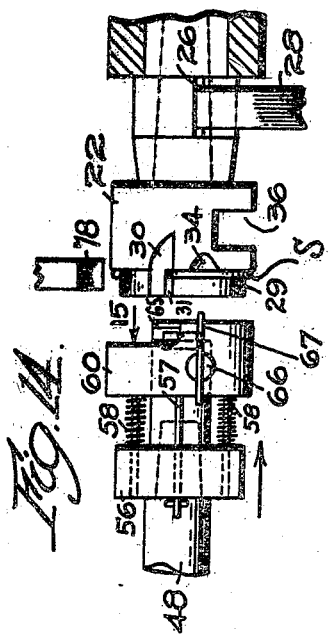
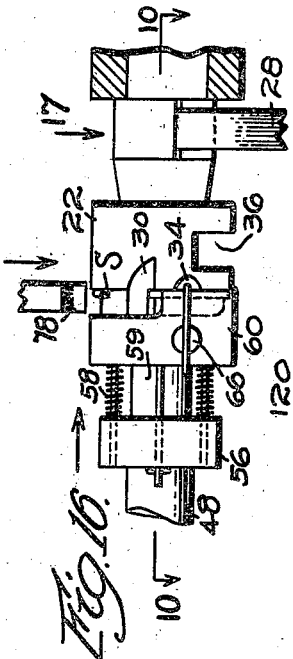
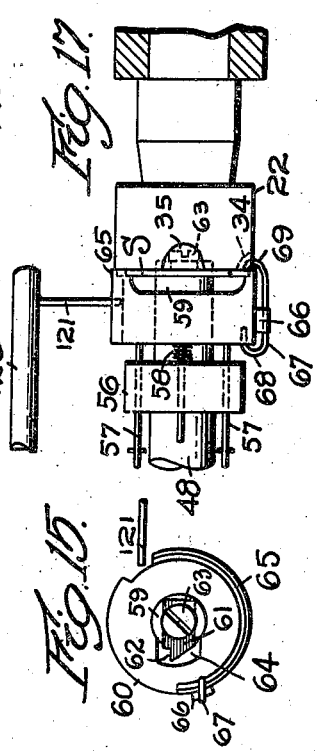
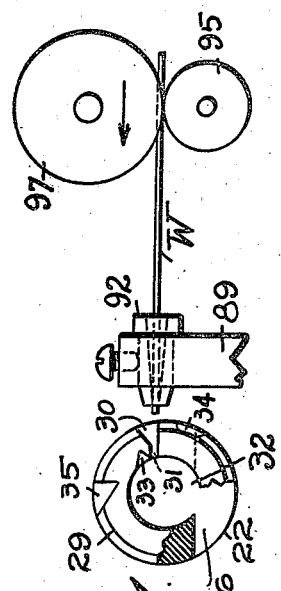
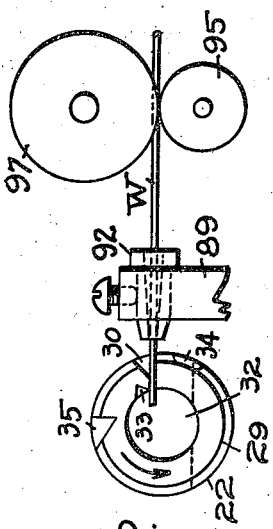
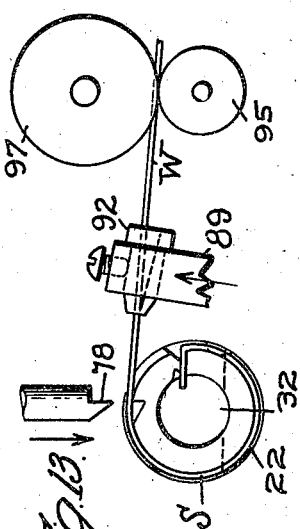
Inventor
N. R. Thibert

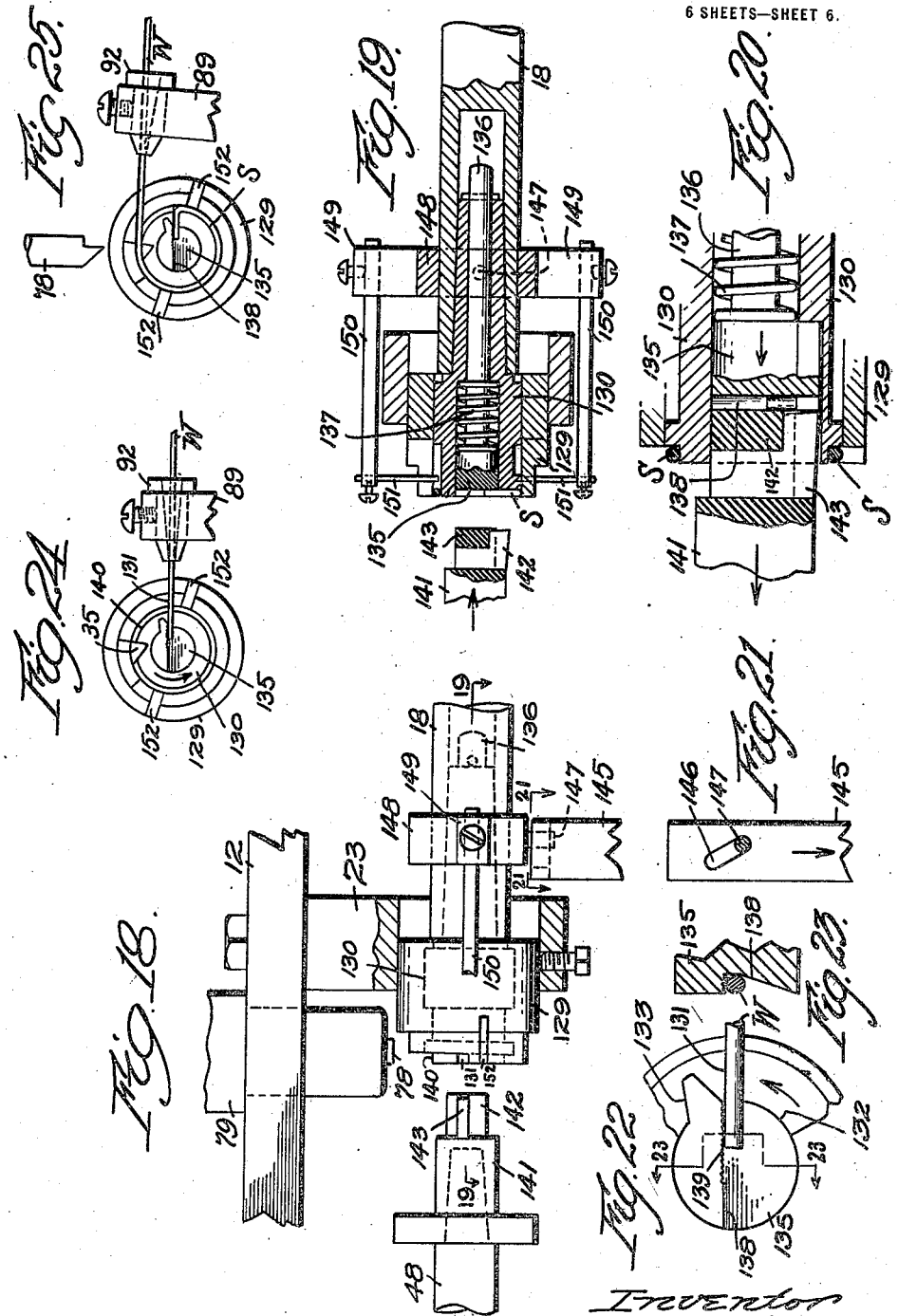

UNITED STATES PATENT OFFICE.

NAPOLEON R. THIBERT, OF WORCESTER, MASSACHUSETTS.

MACHINE FOR FORMING WIRE.

1,426,425.   Specification of Letters Patent.   Patented Aug. 22, 1922.

Application filed March 23, 1921. Serial No. 454,654.

*To all whom it may concern:*

Be it known that I, NAPOLEON R. THIBERT, a citizen of the United States, residing at Worcester, in the county of Worcester and State of Massachusetts, have invented a new and useful Machine for Forming Wire, of which the following is a specification.

The particular object of this invention is to provide a comparatively compact, simple, and quick acting machine for coiling wire into the form of special springs or the like. The invention also involves the organization of such a machine in a form in which the operations may be performed mainly by two shafts, each of which is stationary when the other is turning. The two shafts are provided with means to perform the operations of winding the wire, cutting it off and discharging it in a rapid manner. The invention also involves features of the winding head, the positive operation of the cutting off device, the various adjustments required, the ejection of the completed article from the winding head, means for driving the several parts from the two shafts and controlling their successive operations, and important features of a wire feed device.

Reference is to be had to the accompanying drawings in which

Fig. 1 is a plan of a machine embodying a preferred form of this invention;

Fig. 2 is a front elevation of the same;

Fig. 3 is a sectional view on the line 3—3 of Fig. 2;

Fig. 4 is a transverse sectional view on the line 4—4 of Fig. 1, on enlarged scale;

Fig. 5 is a front elevation of a portion of the wire feeding device on an enlarged scale looking in the direction of the arrow 5 in Fig. 4;

Fig. 6 is a transverse sectional view on the line 6—6 of Fig. 5;

Fig. 7 is a view of the wire on an enlarged scale after it has passed through the feeding and knurling rolls shown in Fig. 4;

Fig. 8 is a front elevation on an enlarged scale, with parts in section on a central plane and with other parts omitted, showing the wire working elements in the position occupied after a finished coil is ejected;

Fig. 9 is an end view of the operating cam shown at the bottom of Fig. 8;

Fig. 10 is a central horizontal sectional view of the wire coiling head in section on the line 10—10 of Fig. 16;

Fig. 11 is a diagrammatic view similar to part of Fig. 4 showing the position of the parts as the wire is fed up to the coiling head, parts of the latter appearing in section;

Fig. 12 is a similar view showing the position when the wire has been inserted in the head and the head is about to start its rotating movement in the direction of the arrow;

Fig. 13 is a similar view showing the completion of the coiling operation;

Fig. 14 is a side view of the wire coiling head and associated parts in substantially the position shown in Fig. 8, but illustrating the wire coil still in position on the head as shown in Fig. 13;

Fig. 15 is an end view of the complementary member to the wire coiling head looking in the direction of the arrow 15 in Fig. 14;

Fig. 16 is a view similar to Fig. 14 showing the next step in which the two heads have come into engagement with each other;

Fig. 17 is a plan of the same with the parts in the same position, looking in the direction of the arrow 17 in Fig. 16;

Fig. 18 is a front elevation of parts for taking the place of certain elements shown in Fig. 8 and constituting a preferred embodiment of this invention;

Fig. 19 is a central vertical view on the line 19—19 of Fig. 18;

Fig. 20 is a similar view on larger scale showing the parts in a different position;

Fig. 21 is a fragmentary plan showing an operating connection from the wire feeding device;

Fig. 22 is an enlarged end view of the yielding plunger showing its provisions for receiving the end of the wire;

Fig. 23 is a fragmentary sectional view of the same, and

Figs. 24 and 25 are diagrammatic views similar to Figs. 12 and 13 showing the operation of this form of the invention.

With certain changes which any mechanic may make, this invention is designed for forming wire into almost any kind of a shape within wide limits. It involves a rotary head which, if round, will form the wire into a circular coil or spring. If this head is given another shape the product will be modified accordingly. If it is given one turn for each operation, as shown, the coil will have only one convolution. It also involves a plunger reciprocable in line with the axis of the rotary head. This plunger can shape the wire after coiling or cut it off or perform any desired operation on it within certain limits. It can be operated rapidly back and forth.

I have shown the machine in the first seventeen figures as constructed with the object of producing a single coil spring such as is shown in my patent on a nut lock, No. 1,352,103, patented September 7, 1920. This spring is shown in that patent as comprising a nearly complete coil of wire and having an inward, nearly radial, bend at one end and an outward bend at the other with a short space between them. It may have other features as will appear herein.

I have designed this machine to comprise two groups of mechanism each one entirely inoperative when the other is in action. For the purpose of operating the mechanism I have shown a pulley 10 for which, however, may be substituted a motor or any other means for producing or transmitting power. This is fixed to a driving shaft 11 which is located in suitable bearings on a frame 12 which supports all parts of the machine. On this shaft is a heavy fly wheel 13 for the purpose of keeping the rotation smooth and uniform when the machine changes over from one operative shaft to the other.

On the shaft 11 is a gear 14 meshing with a gear 15 which is located on a central shaft 16 mounted on the frame. Also fixed on this shaft 16 or to the gear 15 is a mutilated gear 17. This gear is provided with teeth around substantially half of its circumference, the rest of the gear being smooth.

In practice I find it desirable to have one more tooth on the toothed part than would be necessary to cover just half of the circumference of the gear. Located on opposite sides of this shaft 16 and at equal distances from the center are two operating shafts 18 and 19, these two shafts are each provided with a gear. These two gears 20 and 21 are shown as of the same diameter and located in position to mesh with the teeth of the gear 17 whenever that gear turns into proper position therefor.

The shaft 16 which rotates constantly has only one function, namely, to operate a wire feeding device. The shaft 18 at the top also has only one function for it carries, in a Morse taper socket 25 at its end the shank of a wire coiling head 22. On the frame of the machine is a bracket 23 which has a cylindrical bearing 24 located in stationary position in which the cylindrical head 22 is adapted to rotate.

I have provided means for holding the shaft 18 stationary when it completes its rotation. The shank of the head 22 is provided with a depression on one side forming a tooth 26 having a radial edge. Mounted in stationary position on a bracket 27 is a spring 28 shown as flat and bearing on the cylindrical surface of the shank. The tooth 26 is so located that every time the gear 17 passes out of mesh with the gear 20 at the top, the shaft 18 will be left in such position that the spring 28 has just sprung over the tooth 26. Consequently, no force brought to bear on the head 22 will cause it to rotate backwardly and it will remain in the position in which it was left by the gear and ready to be turned again when the gear teeth 17 come around.

The head 22 is provided with a cylindrical end 29 on which the wire is adapted to be wound. It is also provided with a notch 30 having converging surfaces for receiving and guiding the end of the wire. This notch has a passage 31 into the interior of the head which is provided with a central passage 32 extending axially through it for a purpose to be described. On the inside surface of this central passage there is a notch 33 at the inner end of the passage 31. The head is also provided with another notch 34 opening into it from the circumference of the cylindrical end 29. The notch 30 is radial on its lower side or substantially so. At about 90° from the notch 30 is a notch 35 for receiving the cutting off tool as will appear. This head is designed to receive the end of the wire in the passage 31 and to turn around a complete turn to coil the wire on the cylindrical end 29 and then to receive cutting off tools to cut both ends of the spring thus produced. From the passage 32 an opening 36 extends out through the wall of the head. This head 22 is the only element operated by the shaft 18. The wall of the passage 31 has a serrated surface 139.

On the shaft 19 which extends throughout the main part of the length of the machine is a notch 40. On the frame is a spring pressed pin 41, having a conical end adapted to engage in said notch and hold this shaft against accidental turning when it has completed a revolution. It will be seen therefore that both of the operating shafts 18 and 19 are rotated alternately and that each one of them is held in stationary position as soon as its rotation is completed. The shaft 18 is held positively against rotation rearwardly on account of the operations that are performed in connection with the head 22. The shaft 19 is held against rotation in either direction but with a yielding action.

On this shaft 19 is a bevel gear 42 operating a bevel gear 43 on a vertical shaft 44. This shaft is provided with a cam 45 which operates against an adjustable screw 47 located in the end of a plunger 48. This plunger is provided with an enlarged end 49 at the rear in which is a longitudinal slot 50 that the end of a pin 51 engages to prevent rotation of this plunger. The enlargement 49 slides in a cylindrical recess in a cylinder 52 held by a bearing block 53 in a bracket 54 mounted on the frame 12. In front of the enlargement 49 is a spring 55 for forcing the plunger back against the cam, the other end of the plunger bearing on the end of the recess in the cylinder 52. The plunger 48 is provided with a Morse taper on the end and on that is mounted a non-rotary head 56. This is fixed to the plunger and moves with it positively. It is provided with slidable guide pins 57 parallel with the axis of the plunger on some of which are springs 58 pressing against a sliding head 60 mounted to slide on a projection 59 on the head 56. The guide pins 57 are shown as fixed to the head 60 and sliding in the perforations through the head 56. On the end of some of the pins 57 there are limiting stops 9. On the projection 59 there is a plate 61 of tool steel having a cutting edge 62. This is held in place by a screw 63 or in any other desired way. The end of the head 60 adjacent to this cutting edge is provided with a recess 64 for receiving the wire to be cut off by the cutter 62. The end of the head 60 is also provided with an arcuate projection 65 which fits over the cylindrical end 29 of the head 22, as will be seen by reference, especially, to Fig. 10.

On this head 60 there is a screw 66 carrying a hook 67 preferably formed of wire. This hook is bent over at one end 68 to enter a recess in the rear end of the head 60. At the other end it is bent over at 69 to form a hook proper. The object of this hook is to enter the recess 34 in the head 22 back of the spring S which is coiled thereon and disengage this spring from the head 22 when the plunger 48 draws back. It will be seen from consideration of the shape of the cam 45 shown in Fig. 1 that the plunger 49 will move forward near the end of the period of rotation of the shaft 19 and that this motion forward is quick. It simply forces the head 60 into registration with the head 22 as shown in Fig. 10 and forces the hook 69 beyond the spring S. When it comes back very rapidly as the screw 47 slides off the apex of the cam 45 the spring will bring the plunger 48 and the parts mounted on the back instantly and with it the spring S.

The motion of the plunger forward forces the cutter 62 into the depression 33 and cuts off that end of the spring. The reason for having the head 22 hollow and providing it with the opening 36 will now be seen. These ends cut off fall into the central passage and are eventually discharged therefrom through the opening 36 as the head rotates.

The shaft 19 also has another function. Directly upon it is located a cam 70. This operates a vertical plunger 71 located in a vertical guide 72 mounted on the frame 12. The upper end of this plunger is shown as provided with an adjusting screw 73 which engages under one end of a lever 74 pivotally mounted on the frame. The other end of this lever engages the top of a plunger 75 which is forced up by a spring 76 engaging a pin 77 on it. The plunger 75 is located in a vertical guide 79 carried by the frame 12. The spring 75 acts to hold the plunger 71 down in contact with its cam at all times as well as to hold the plunger 75 up. On the bottom of the plunger 75 is a cutter 78 which cuts off the outer end of the wire spring S by entering the notch 35 at the proper time.

It has been stated that the shaft 16 rotates continuously. This is provided with a cam 80 which engages a projection 81 on a slide 82. This slide works in ways 83 and is normally drawn back at all times against the cam by a spring 84. Its motion backward is limited by an adjusting screw 85. This slide is provided with a member 86 which is capable of sliding up and down in it and the motion of which in a downward direction is limited by an adjusting screw 87. This vertical slide 86 is provided with a passage 88 through it for a wire guiding arm 89. The latter is pivoted at 90 on a stationary projection constituting a part of the frame 12 which projection also carries a guide 91 for the wire W. This arm 89 is provided with a guide 92 for the wire and is intended to hold the wire projecting slightly from it. It is to be observed that the whole device comprising the slide 86 and the arm 89 constitutes a device capable of swinging on the stationary pivot 90.

I have shown the slide 86 as provided with a central recess at the top in which is a support 94 carrying a roller 95 projecting into a wide passage 96 through which the wire passes. This roller is merely a supporting and guiding roller for the wire. The support is adjusted by a screw 93. Above the roller I provide a second roller 97 which also may be merely a guiding roller but I prefer to make this score or knurl what is to be the outer surface of the spring. For that purpose I provide this roller with scoring marks 98 in the circumferential groove with which it is provided and make it of hardened steel. The lower roller 95 also is provided with a circumferential groove but this has a smooth surface. This roller 97 is mounted on a shaft 99 which is capable of sliding up and down in a slot 100 in the upper part of the slide 86. On both of the two ends of this shaft 99 are two projections 101 extending downwardly from a sliding block 102. A spring 103 bears on this block and normally forces it down so as to force the roller 97 down with strong spring pressure against the wire and cause it to impress any marks on the wire that can be made by the engraving or the like 98 mentioned above. Above the spring 103 is a plate 104. The slide 86 has a frame 105 above and the block 102 and plate 104 have projections 106 and 107 extending into two opposite side grooves 108 in said frame. The frame at the top carries a screw 109 having a knurled head which is used to adjust the pressure of the spring 103.

The lifting of the frame and all parts supported by the slide 86 is caused by the rotation of the head 22 as will be obvious from a comparison of Figs. 12 and 13. It is obvious that as the head rotates from the position shown in Fig. 12, and carries the wire around, it will eventually leave the wire in the position shown in Fig. 13 with the guide 92 elevated and the slide 86 and its supported parts also moved upwardly. As will appear later, the wire is cut off now by the cutter 78. This would leave the wire projecting from the guide 92 with no support for it if it were not for the mechanism which I will now describe. This comprises a projection 110 extending from the frame 105. This is provided with a sliding pin 111 forced outwardly by a spring 112 and its motion limited by a pin 113 projecting into an inverted L-shaped slot in the projection 110. On a stationary bracket 115 on the frame is a slot 116. This slot is provided to receive the end of the pin 111 and has a horizontal surface 117 on which that pin rests when the wire guide 92 moves upwardly. It is so located that the pin, which before that was pressed against the flat surface of the bracket 115, will move up far enough with the guide 92 to spring into the slot over the surface 117 and rest upon the latter. The movement of the main slide 92 backwardly now carries the pin along the surface 117 until it reaches the end of the same and then, the end of the wire having been drawn back from the head 22, the pin 111 drops down into the full line position shown in Fig. 6. When the slide moves forward again the pin moves up an inclined surface 118 and there again rests on the flat vertical surface of the bracket 115. It will be seen therefore that this pin 111 moves in a path which is substantially rectangular and that its function is to hold up the wire guide 92 when the slide 82 is drawing back and then let this guide down so that the end of the wire will not touch the head but will be left in registration with the notch 30 finally.

On the frame is located a rod 120 which has a stationary pin 121 that projects into the path of the spring S after it has been formed. When it is released from the head 22 it engages it and prevents its flying away from the mechanism so that all the springs will drop down into a receptacle which can be located in any convenient position.

*Operation.*

In the operation of the device, the wire W is inserted through the tube 91 and between the rolls 95 and 97 into the guide 92 so as to project slightly through the guide as shown in Fig. 4. The cam 80 on the shaft 16, which rotates constantly, forces forward the slide 82 and projects the end of the wire extending from the guide 92 into the slot 31. This action takes place because, although the rollers 95 and 97 are not positively operated, yet they are pressed together so hard that they grip the wire and force it to move along with them. In other words, the wire moves from the postion shown in Fig. 11 to that shown in Fig. 12, the head 22 being held in stationary position by the spring 28.

During the above mentioned operation the shaft 19 has been operating and it now comes to a stop and is held in stationary position by the pin 41. The gear 17, as it passes out of mesh with the gear 21 to leave the shaft 19 stationary, enters into mesh at its other end with the upper gear 20 and starts the shaft 18 to rotating. The first result of this is to rotate the head 22 and bend the wire around the projection on it and leave these parts in the position shown in Figs. 13, 14 and 15. This completes a full revolution of the shaft 18. The gear 17 then passes out of mesh with it, leaving it in the position shown in the three figures just mentioned which also is the position shown in Fig. 4. It is to be noted that both of the operating shafts 18 and 19 cannot rotate at the same time. This constitutes an important safety feature. Now the gear 17 immediately meshes with the lower gear 21 and starts the shaft 19. The first effect of this is to push forward the plunger 48 by means of the cam 45. This results in the blade 62 cutting the inner end of the newly formed spring S located on the head 22. The severed end drops into the passage 32. This position of the parts is shown in Figs. 16, 17 and 10. At substantially the same time the cam 70 acts to force down the plunger 75 and causes the blade 78 to descend from the position shown in Fig. 13 into the notch 34 and sever the wire at that end. The pin 111 at this time is in the dotted line position shown in Fig. 6. Therefore, as the slide 82 now starts to move back the wire will be held up in the position shown in Fig. 13 until this slide moves nearly back to its limiting position. Then the pin 111 will drop down to the full line position.

It will be noted in Figs. 16, 17 and 10 that when the two heads 60 and 22 have come together the hook 69 will engage over the spring located on the head 22. Now the next action is the withdrawal of the plunger 48 by reason of the fact that the screw 47 has passed over the high point of the cam 45. The spring 55 therefore brings the plunger back and the hook 69 draws the spring off the head 22. As this is a spring it would be apt to fly out of the machine at this time were it not for the pin 121 which is located in position to engage it as it moves along with the head and keep it from flying outwardly.

At this time the cam 80 starts to bring the slide back and the pin 111 yields and moves up the incline 118 on the flat surface of the bracket 115. This action, of course, has no effect on the elevation of the guide 92 which drops down when the pin 111 passes from the horizontal surface 117. The wire is now in registration with the stationary passage 31 and as the slide 82 moves forward the wire is projected into that passage and the operation repeated. It will be understood, of course, that the shaft 19 will stop when the gear 17 moves out of mesh with its gear 21 which is at the time that the plungers 48 and 75 have withdrawn and the spring S has been discharged from the machine.

In the form of the invention shown on the last sheet the construction is simplified and the means for cutting off and ejecting the inner end of the coil is made more positive and compact and in such form as to eliminate the necessity of having a passage 36 in the rotating head. In this case the bracket 23 is provided with a stationary collar 129 and the shaft 18 is provided with a rotary coiling head 130 thereon. This head rotates but does not reciprocate. It is provided with a radial slot at 131 for receiving the wire in the same way as before, and with a central passage 132 having a notch 133. This passage, instead of being open, is filled by a plunger 135 fitting it and the notch. The plunger is provided with a rod 136 extending back on which is a spring 137 engaging a shoulder in the head 130 and forcing the plunger normally forward. In its normal position its front end is flush with the end of the head 129. It is obviously capable of yielding as shown in Fig. 20. This plunger has a slot 138 across it which is provided with a slanting surface on one side and a flat roughened or serrated surface 139 parallel with the axis on the other. This surface 139 like the one shown in the other form is serrated to cause it to hold the end of the wire and prevent its being dislodged when the head turns. This head, like the head 22, is provided with a shoulder on which the wire can be coiled in the same way. This shoulder 140 is spaced from the inner wall of the collar 129 to permit a wire spring to be formed between these two surfaces by the rotation of the head 130.

For the purpose of cooperating with this preferred type of head I mount on the plunger 48 a cutting head 141 which, instead of having the more complicated mechanism shown in the first form, is provided simply with an integral end 142 of reduced diameter having a hardened steel cutting blade 143 projecting therefrom. The two are of such shape as to fit within the passage 132 centrally located in the head 130 and also fitting the notch 133 therein which has longitudinal walls. Thus the blade 143 coacts with the fixed wall of the notch 133 to cut off the end of the wire therein.

As a simplified form of ejector, I also provide the feed carriage 82 with a bracket 145 having an inclined slot 146 therein. Into this slot projects a pin 147 carried on the bottom of a collar 148 which is slidably mounted on the shaft 18. This collar has opposite ears 149 which hold two parallel rods 150, each of which carries an ejecting pin 151. These pins project radially in line with each other into a pair of slots 152 in the stationary collar 129.

The operation of this form of the invention is very simple. The wire is fed in by the carriage 82 in the same way as in the other form, and as indicated in Fig. 24. Then the head 130 is rotated a complete revolution. This carries the wire around with it to the position shown in Fig. 25 in the same way as before. This having been accomplished the other shaft starts, as in the other case, and the plunger 48 advances rapidly and presses the reduced end 142 into the passage in the end of the head 130. The blade 143 therefore enters the notch 133 and cuts off the inner end of the wire as clearly indicated in Fig. 20.

This action takes place against the pressure of the spring 137. Now the plunger 48 moves back at once quickly and the spring 137 forces the plunger 135 out until its end is flush with the end of the head 130. This discharges the severed end of the wire. When the slide 82 again advances to feed the wire up to the position shown in Fig. 24 its bracket 145 operates the pin 147 and therefore slides the collar 148 and the pins 151 to the left in Fig. 19, engage the spring at diametrically opposite points and discharge it.

It will be noted that several elements numbered the same as in the other figures are also present in this form, and it is not necessary to describe them again.

Although this machine in both forms shown involves a considerable number of parts they are of small size and compactly arranged so that the whole machine takes up very little space. On account of operating the various parts positively by cams, quick action can be secured with the various tools employed and springs can be made at an exceedingly high rate of speed. I am aware of the fact that the machine as shown in the drawings is designed to make a spring of a particular shape and if it is desired to make springs of other shapes, or of more than one coil, modifications can be made in this machine by any one skilled in this art, without departing from the scope thereof as expressed in the appended claims. Therefore, I do not wish to be limited to the details of construction or combinations of parts designed particularly for the making of a special spring or coil except as specified in the appended claims.

Having described the invention what I claim is:—

1. In a wire working machine, the combination of a driving shaft, a pair of operating shafts, means connected with the driving shaft for first driving one of the operating shafts through exactly a complete revolution and then driving the other operating shaft through exactly a complete revolution, and wire working devices connected with each of said operating shafts to be operated thereby.

2. In a wire working machine, the combination of a gear having teeth around substantially half of its circumference only, means for rotating said gear constantly, a pair of gears, each of half the diameter of said gear, located diametrically opposite each other with respect to it and in position to mesh with it, a pair of operating shafts, one connected with each of the gears of said pair, whereby said shafts will rotate a complete revolution alternately, and wire working tools connected with each of said shafts.

3. In a wire working machine, the combination of a driving shaft, a fly wheel operated thereby, a gear operated continuously by said shaft and provided with teeth throughout substantially half of its circumference only, a pair of gears located opposite each other in position to mesh with the teeth of said gear, and two shafts driven by said gears respectively, each of said shafts having means for performing certain wire working operations, whereby the operations performed by one shaft will be suspended while the other shaft is rotating.

4. In a wire working machine, the combination of a main driving shaft, a pair of operating shafts, means connected with the main driving shaft for first driving one of the operating shafts and then driving the other operating shaft, wire working devices connected with each of the shafts of said pair, and means for preventing said shafts from rotating in a reverse direction when they are not rotated positively by the main shaft.

5. In a wire working machine, the combination of a gear having teeth around half of its circumference only, means for rotating said gear constantly, a pair of gears, each half the diameter of said gear, located opposite each other with respect to it and in position to mesh with it, a pair of operating shafts connected with each of the gears of said pair, whereby each shaft will rotate a complete revolution, a wire coiling head mounted on one of said shafts, the shaft carrying the head having a tooth thereon and a spring mounted adjacent to the shaft and engaging the tooth as it comes into position to stop for holding the shaft against rotation in the reverse direction.

6. In a wire coiling machine, the combination of a gear having teeth around half of its circumference only, means for rotating said gear constantly, a pair of gears located in position to mesh with the first named gear, operating shafts connected with each of the gears of said pair, whereby said operating shafts will rotate alternately, wire working tools connected with one of said operating shafts, a head for coiling a wire operated by the other operating shaft, means for preventing said head from rotating in a reverse direction at the instant when it comes to a stop, and means for preventing the rotation of the other shaft when it is not rotated by the main shaft.

7. In a wire coiling machine, the combination of a main driving shaft, a pair of operating shafts, means connected with the main driving shaft for first driving one of the operating shafts through a complete revolution and then driving the other operating shaft through a complete revolution, a wire coiling head mounted on one of said shafts, the shaft carrying the head having a tooth thereon and a spring mounted adjacent to the shaft and engaging the tooth as it comes to a stop for holding the shaft against rotation in the reverse direction.

8. In a wire coiling machine, the combination of a main driving shaft, a pair of operating shafts, means connected with the main driving shaft for first driving one of the operating shafts and then driving the other, a rotary head connected with one of said shafts and having means for receiving the end of a wire and therefore coiling the wire around it when the head rotates, and means operated by the other shaft for cutting off the wire coiled on said head.

9. In a wire coiling machine, the combination, of a gear having teeth around part of its circumference only, means for rotating said gear, a pair of gears located in position to mesh with it, a pair of operating shafts connected with each of the gears of said pair, a rotary head connected with one of said shafts and having means for receiving the end of a wire and therefore coiling the wire around it when the head rotates, means operated by the other shaft for cutting off the wire coiled on said head, and means also operated by the other shaft for engaging the coil and detaching it from the head.

10. In a wire coiling machine, the combination of a gear operated continuously and provided with teeth throughout part of of its circumference only, a pair of gears located in position to mesh with the teeth of said gear, a rotary head connected with one of said gears and having means for receiving the end of a wire and therefore coiling the wire around it when the head rotates, means operated by the other gear for cutting off the wire coiled on said head, means also operated by the other gear for cutting off the other end of the wire, and means operated by said other gear for engaging the coil and detaching it from the head.

11. In a wire coiling machine, the combination of a pair of operating shafts, a rotary head connected with one of said shafts and having means for receiving the end of a wire and coiling the wire around it when the head rotates, means operated by the other shaft for cutting off the wire coiled on said head, and means also operated by the other shaft for engaging the coil and detaching it from the head.

12. In a wire coiling machine, the combination of a rotary head having means for receiving the end of a wire and coiling the wire around it when the head rotates, means for cutting off the wire coiled on said head, means for cutting off the other end of the wire, and means for engaging the coil and detaching it from the head.

13. In a wire coiling machine, the combination of a head having a surface thereon of the shape of the inside of the coil to be made, and means for rotating said head a complete revolution and then stopping it, with a plunger, means for moving said plunger toward the head and moving it back again, and a cutter on said plunger for engaging the end of the coil on the head and cutting it off at a predetermined position.

14. In a wire coiling machine, the combination of a pair of shafts, means for rotating one shaft a complete revolution and then stopping it, means for rotating the other shaft thereafter through a complete revolution and stopping it, a head mounted to rotate with the first named shaft, said head having a surface thereon for receiving the wire to be coiled and means for engaging and holding the forward end of such wire, whereby on the rotation of the head the wire will be coiled around it, means connected with the other shaft for cutting off the outer end of the wire coiled on the head, a plunger operated by said other shaft and a cutter on the plunger for cutting off the forward end of the wire while on the rotary head.

15. In a wire coiling machine, the combination of a head having a surface thereon of the shape of the inside of the coil to be made, and means for rotating said head a complete revolution and then stopping it, with a reciprocable plunger, means for moving said plunger toward the head after the head stops and moving it back before the head starts again, a cutter on said plunger for engaging the end of the coil on the head and cutting it off at a predetermined position, and means on the reciprocable head for engaging the coil and detaching it from the rotary head when the reciprocable head moves back.

16. In a wire coiling machine, the combination of a pair of shafts, means for rotating one shaft a complete revolution and then stopping it, means for rotating the other shaft thereafter through a complete revolution and stopping it, a head mounted to rotate with the first named shaft, said head having a surface thereon for receiving the wire to be coiled, and means for engaging and holding the forward end of such wire, whereby on the rotation of the head the wire will be coiled around it, with means connected with the other shaft for cutting off the outer end of the wire on the head, a plunger operated by said other shaft and having on the end a cutter for cutting off the forward end of the wire while on the rotary head, a head reciprocably mounted on said plunger to move with it but capable of yielding when it engages the rotary head, and means on the reciprocable head for engaging the wire on the rotary head and detaching it therefrom when the plunger moves back.

17. In a wire coiling machine, the combination of a head mounted to rotate having a surface thereon for receiving the wire to be coiled, and means for engaging and holding the forward end of such wire, whereby on the rotation of the head the wire will be coiled around it, with means for cutting off the outer end of the wire on the head, a plunger having on the end a cutter for cutting off the forward end of the wire while on the rotary head, a head reciprocably mounted on said plunger to move with it but capable of yielding when it engages the rotary head, and means on the reciprocable head for engaging the wire on the rotary head and detaching it therefrom when the plunger moves back.

18. In a machine of the character described, the combination of an intermittently rotatable head having a substantially radial passage therein for receiving the forward end of a wire, whereby when the head rotates the wire will be coiled around the head with the forward end remaining in said passage, said head also having a notch adjacent to the position the wire occupies thereon, reciprocable means for engaging the head when it stops rotating, and an extractor connected with said reciprocable means and adapted to enter said notch behind the wire, whereby when said reciprocable means is withdrawn it will dislodge the coil from the head.

19. In a wire coiling machine, the combination of a head having a passage therein provided with an opening to the exterior thereof and having a passage from its outer wall into the first named passage of such size as to receive a wire to be operated on, means for inserting the end of a wire in the second passage, means for rotating the head a revolution to coil the wire around the same with the end bent inwardly in said second passage, and means movable toward the end of said head for cutting off the end of the wire in said second passage, whereby the severed end will drop into the central passage and be discharged through said opening.

20. In a wire coiling machine, the combination of an intermittently rotatable head having means for holding the forward end of a wire and a surface for receiving the wire when the head rotates to form it into a coil, said head having a notch near said means, and a cutter movable into said notch when the head is stationary to cut off the end of the wire.

21. In a wire coiling machine, the combination of a rotatable head having a passage therein provided with an opening to the exterior thereof and having a passage from its outer wall into the first named passage of such size as to receive the end of a wire to be operated on, means for rotating the head a revolution to coil the wire around the same with the end bent inwardly in said second passage, and means movable toward the end of said head for cutting off the end of the wire in said second passage, whereby the severed end will drop into the central passage and be discharged through said opening, with a reciprocable head mounted on said means yieldingly and having means for detaching the coiled wire from the said rotary head.

22. In a wire coiling machine, the combination of an intermittently rotatable head adapted to coil a wire thereon by its rotation, a plunger reciprocable in central alignment with said head, a cutter on the end of the plunger for cutting off the inner end of the wire in said head, a second head freely movable on said plunger having yielding means for forcing it toward the first named head, a hook carried by the second head adapted to engage the coil on the first head when it moves toward it and to detach the coil when the second head moves back, and means for operating said plunger when the rotary head is stationary.

23. In a wire coiling machine, the combination of an intermittently rotatable head having a passage therein provided with an opening to the exterior thereof and having a passage from its outer wall into the first named passage of such size as to receive a wire to be operated on, means for rotating the head a revolution to coil the wire around the same with the end bent inwardly in said second passage and then stopping its rotation, and means movable toward the end of said head for cutting off the end of the wire in said second passage, whereby the severed end will drop into the central passage and be discharged through said opening when the head rotates again, with a reciprocable head mounted on said means yieldingly and having means for detaching the coiled wire from the said head, and a reciprocating cutter for cutting off the other end of the wire.

24. In a wire coiling machine, the combination of a rotary head for coiling a length of wire thereon, a shaft for operating it, a second shaft, a cam operated by the second shaft, a plunger in position to be operated by the cam, a spring for holding the plunger back against the cam, a cutter mounted on the end of the plunger, and a spring-extracting head yieldingly mounted to reciprocate on the plunger and having means for discharging a spring from the head.

25. In a wire coiling machine, the combination of an intermittently rotatable head for coiling a length of wire around it, a plunger reciprocable in alignment with said head, a second head yieldingly mounted on the plunger, a hook on the second head adapted to engage over a wire or coil on the rotary head on the forward movement of the reciprocatory head and to discharge the coil when it moves back, and a fixed stop adjacent to the rotary head for limiting the motion of the coil in that direction.

26. In a wire coiling machine, the combination of a head for coiling a wire around it, a shaft, a cam on the shaft, a plunger operated by the cam, a lever having one end in position to be operated by the plunger, a cutter parallel with said plunger and arranged to be operated by the other end of the lever, said cutter being in position to cut off a coil of wire on the head.

27. In a wire working machine, the combination of a driving shaft, a pair of operating shafts, means connected with the driving shaft for first driving one of the operating shafts through a complete revolution and then driving the other operating shaft through a complete revolution, and wire working devices connected with each of said operating shafts to be operated thereby, with means operated by said driving shaft, independently of said operating shafts, for feeding a wire into engagement with said wire working devices.

28. In a wire working machine, the combination of a main driving shaft, a pair of operating shafts, means connected with the main driving shaft for first driving one of the operating shafts and then driving the other operating shaft, wire working devices connected with each of the shafts of said pair, means for preventing said shafts from rotating in a reverse direction when they are not rotated positively by the main shaft, and means operated by said driving shaft, independently of said operating shafts, for feeding a wire into engagement with said wire working devices, with a transverse reciprocating motion.

29. In a wire coiling machine, the combination of a rotary head having a passage in it located nearly radially, a wire feeding device having a wire guide for the end of the wire, means for reciprocating said feeding device to force the end of the wire into said passage, and means for then rotating the head to coil the wire thereon.

30. In a wire coiling machine, the combination of a rotary head having a passage, a wire feeding device having a wire guide for the end of the wire, means for reciprocating said feeding device to force the end of the wire into said passage, means for then rotating the head to coil the wire thereon, and means whereby as the wire is coiled on the head the feeding device can be lifted by the wire to prevent the bending of the wire between the guide and the head.

31. In a wire coiling machine, the combination of a rotary head having a passage in its wall, a wire feeding device, means for reciprocating said feeding device to force the end of the wire into said passage, means for then rotating the head to coil the wire thereon, means whereby as the wire is coiled on the head the feeding device can be lifted by the wire, and means for positively holding the guide in its elevated position until the feeding device has moved back out of the way.

32. In a wire coiling machine, the combination of a rotary head, a wire feeding device, means for reciprocating said feeding device to move the end of the wire into engagement with said head, means for then rotating the head to coil the wire thereon, means whereby as the wire is coiled on the head and lifted thereby the feeding device can move up with the wire, said feeding device having a spring-pressed plunger, and a bracket provided with an L-shaped opening with one arm thereof horizontal for receiving said plunger and having its vertical wall inclined to permit the plunger to be drawn up the incline as the feeding device moves toward the work, whereby the guide will be held up while the feeding device moves back.

33. In a feeding device for a wire coiling machine, the combination of a slide, means for reciprocating said slide, a transverse slide mounted thereon and freely movable therein, a pivoted arm along which the vertical slide is adapted to move, said arm being located substantially in a position parallel with the direction of motion of the slide, and having a wire guide thereon, whereby when the wire guide is moved the transverse slide will be moved with it.

34. In a feeding device for a wire coiling machine, the combination of a slide, means for reciprocating said slide toward and from the wire coiling mechanism, a vertical slide mounted thereon and freely movable up and down therein, a pivoted arm along which the vertical slide is adapted to move, said arm being located substantially in horizontal position and having a wire guide thereon above its pivot, whereby, when the wire guide is held up, the vertical slide will be held up with it, and means for positively holding said arm up until the slide moves to its rearmost position.

35. In a wire coiling machine, the combination of a reciprocable slide, a transverse slide mounted to move in said slide and having a passage through it substantially parallel with the direction of motion of the first slide, an arm extending through the last named passage and pivoted beyond it at its end, said arm having an extension, a wire guide on said extension, whereby when a wire in said guide is moved transversely to the direction of motion of the first slide it will move the second slide with it.

36. In a wire coiling machine, the combination of a reciprocable slide having a transverse passage therein, a transverse slide mounted to move in said passage and having a passage through it parallel with the direction of motion of the first slide, an arm extending through the last named passage and pivoted beyond it at its end, said arm having an extension, a wire guide on said extension, whereby when a wire in said guide is moved transversely to the direction of motion of the first slide it will move the second slide with it, a spring-pressed pin mounted on said second slide, a stationary guide for said pin to hold it in extreme position, and therefore hold the second slide in a corresponding position while the first slide is at one extreme, and means for allowing the second slide to move back when the first slide moves back.

37. In a wire coiling machine, the combination of a reciprocable slide having a transverse passage therein, a transverse slide mounted to move in said passage and having a passage through it substantially parallel with the direction of motion of the first slide, an arm extending through the last named passage and pivoted beyond it at its end, said arm having an extension, a wire guide on said extension, whereby when the wire in said guide is moved transversely to the direction of motion of the first slide it will move the second slide with it, a pair of guide rollers on the second slide for the wire located in alignment with said guide, yielding means for pressing one roller against the other, and means for adjusting the other roller, one of said rollers having a surface adapted to make marks on one surface of the wire.

38. In a wire coiling machine, the combination of a reciprocable slide, a wire guide, a pair of guide rollers on the slide for the wire located in alignment with said guide, yielding means for pressing one roller against the other, and means for adjusting the other roller, one of said rollers having a surface adapted to make marks on the wire.

39. A rotary wire coiling head having a radial slot for receiving the end of a wire to be coiled, a peripheral surface for receiving and forming the coil, an axial passage therein into which said slot extends, and a spring pressed plunger in the passage having a cutting edge.

40. A rotary wire coiling head having a radial slot for receiving the end of a wire to be coiled, and a peripheral surface for receiving and forming the coil, said surface being round and in the plane of said slot, whereby a flat coil will be formed with an inwardly extending radial end, and means within the head for cutting off the extreme inner end of the wire at a distance inside said peripheral surface.

41. The combination with a wire feeding guide, of a rotary wire forming head having a slot for receiving the end of the wire, said guide being freely movable toward said head, whereby the guide will move with the wire as it is coiled on the head by its rotation.

42. In a wire forming machine, the combination of a head adapted to turn on an axis, to receive the end of a wire, and to bend it upon its surface when it turns, means movable axially toward said head for cutting off the end of the wire in said head, and means movable in a transverse direction for cutting off the wire.

43. In a wire forming machine, the combination of a head adapted to turn on an axis to receive the end of a wire and to bend it upon its surface when it turns, said head having a central passage therein and means movable axially toward said head for cutting off the end of the wire within said passage.

44. In a wire forming machine, the combination of a rotary head for forming a wire on its surface by rotation thereof, a plunger movable axially toward the head, said head having a passage therein having a notch, a spring pressed plunger in the passage for receiving the end of the first named plunger, the first named plunger having a cutting off tool thereon, adapted to enter said notch and fit it, whereby the inner end of the wire will be cut off and when the spring moves the second plunger outwardly it will discharge the wire cut off.

45. In a wire forming machine, the combination of a rotary head, a plunger movable toward the head, said head having a passage therein, a spring pressed plunger in the passage for receiving the end of the first named plunger, the first named plunger having a cutting off tool thereon, whereby the inner end of the wire will be cut off and when the spring moves the second plunger outwardly it will discharge the wire cut off.

46. In a wire forming machine, the combination of a rotary head, a plunger movable toward the head, said head having a passage therein with a spring pressed plunger in the passage for receiving the end of the first named plunger, the first named plunger having a cutting off tool thereon, a wire feeding device, and means operated by the wire feeding device for ejecting the product from the machine when the wire is fed to it the next time.

47. In a wire forming machine, the combination of a rotary head for forming a wire on its surface, a plunger movable axially toward the center of the head, said head having a passage therein with a spring pressed plunger in the passage for receiving the end of the first named plunger, the first named plunger having a cutting off tool thereon, whereby when the second plunger moves outwardly it will discharge the wire cut off, a wire feeding device, and means operated by the wire feeding device for ejecting the product from the machine when the wire is fed to it the next time.

48. In a wire forming machine, the combination of a rotatable head adapted to receive the end of a wire and to bend it upon its surface when it rotates, means movable toward said head for operating on the wire held thereby to perfect the form of the article made, means for cutting off the wire, a slide movable along the head having a pair of arms projecting in toward the head for engaging the product at opposite sides of the head, and means for moving said slide along the head to eject the product.

In testimony whereof I have hereunto affixed my signature.

NAPOLEON R. THIBERT.